July 23, 1957 H. E. BESTE 2,800,528

VIDEO AMPLIFIER BRIDGE CIRCUIT FOR MINIMIZING SUPPLY VOLTAGE VARIATIONS

Filed June 23, 1949 2 Sheets-Sheet 1

INVENTOR.
HAROLD E. BESTE
BY Darby & Darby
Attorneys

July 23, 1957 H. E. BESTE 2,800,528

VIDEO AMPLIFIER BRIDGE CIRCUIT FOR MINIMIZING SUPPLY VOLTAGE VARIATIONS

Filed June 23, 1949 2 Sheets-Sheet 2

INVENTOR.
HAROLD E. BESTE

BY Darby & Darby

Attorneys

United States Patent Office 2,800,528

Patented July 23, 1957

2,800,528

VIDEO AMPLIFIER BRIDGE CIRCUIT FOR MINIMIZING SUPPLY VOLTAGE VARIATIONS

Harold E. Beste, Verona, N. J., assignor to Allen B. Du Mont Laboratories, Inc., Passaic, N. J., a corporation of Delaware Application June 23, 1949, Serial No. 100,855

2 Claims. (Cl. 178—7.5)

This invention relates generally to television apparatus and particularly to methods and means for eliminating the detrimental effects of supply voltage variations upon picture quality in television receivers and the like.

In the usual type of television receiver a picture is made up in part by the variation of intensity of a beam of electrons in a cathode ray tube. For this purpose a voltage to an electrode in this tube is supplied from the output of a video amplifier tube. This amplifier tube in turn derives its power from a source of direct current which is obtained by rectifying alternating current obtained from the usual 60 cycle power supply.

It has been found in many locations where receivers are operated that this 60 cycle supply is subject to variations, which variations cause fluctuations in the direct current supplied to the video amplifier, the cathode ray tube, and other parts of the receiver.

One detrimental effect of these line voltage variations is to cause variations in picture brightness. An object of my invention is to prevent or minimize this effect.

Another detrimental effect is to cause variations in the circuits by which synchronization signals are separated from video signals. A second object of my invention is to minimize this effect so that better synchronization of the signal is obtained.

Other objects of my invention will be more apparent from the following description, claims and accompanying drawings in which:

Figure 1:
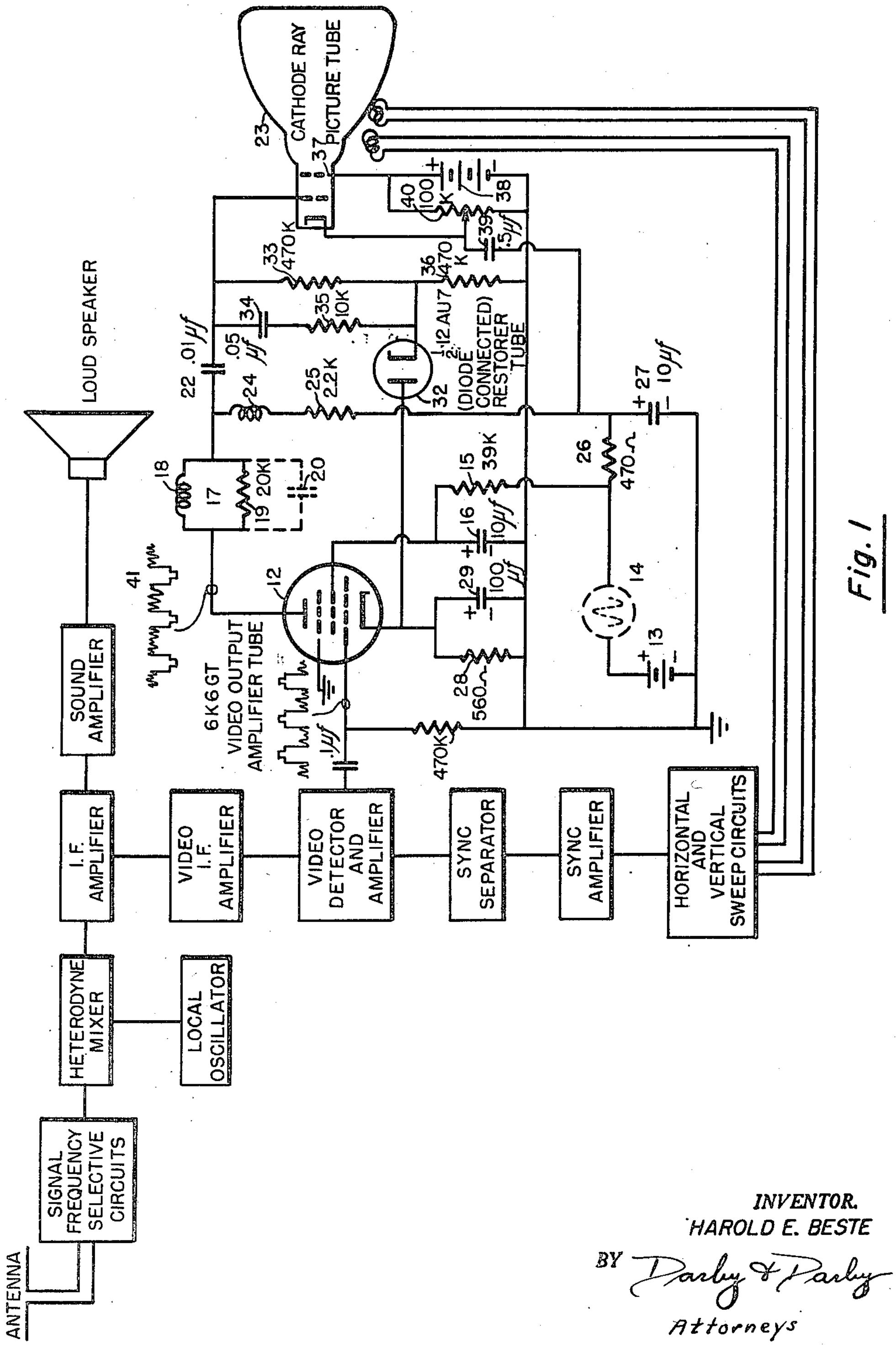
Figure 1 is a schematic diagram of the video amplifier and picture tube of a television receiver embodying the invention and including in block diagram form the preceding circuit portions of the receiver.

Referring to Figure 1, desired signals for the video amplifier are obtained from the usual preceding stages of the receiver, and they are fed to the grid of a video pentode amplifier tube 12 which obtains its operating power from a source 13 of direct current. Fluctuations in the line voltage are indicated in dotted lines in the schematic drawing as an alternating voltage generator 14 in series with the direct current source 13, the series combination being hereinafter referred to as the B supply. The screen of the amplifier tube 12 receives positive voltage through a resistor 15 and is bypassed to the negative side of the B supply by means of a capacitor 16. The plate of the amplifier tube 12 is connected to an anti-resonant circuit 17 comprising an inductance 18 and a resistance 19 in parallel, the distributed capacitance 20 of both elements shown in dotted lines and resonating with the inductance at a frequency of 4.5 megacycles per second. The anti-resonant circuit is connected to a blocking condenser 22 which in turn is connected to the control electrode of a cathode ray tube 23. The junction of the anti-resonant circuit 17 and the blocking condenser 22 is connected back to the positive side of the B supply by means of the series combination of a peaking inductance 24, a damping resistor 25, and a filter resistor 26, the junction of the two resistors being bypassed to the negative side of the B supply by a condenser 27.

Bias for the cathode of the amplifier tube 12 is obtained from the cathode resistor 28, this being bypassed at video frequencies by the capacitor 29.

A picture brightness tube 32 has its cathode connected to the grid of the cathode ray tube 23 through a resistor 33 and the series combination of a capacitor 34 and a resistor 35. This cathode is also connected to the negative side of the B supply through the resistor 36. The plate of the brightness tube 32 which in the prior art is usually returned to the negative end of the B supply, is in this embodiment of my invention returned to the cathode of the amplifier tube 12.

The first anode 37 of the cathode ray tube is connected to a second source 38 of direct current. The cathode of the cathode ray tube 23 is bypassed to the positive side of the B supply by means of the condenser 39 and connected to the slider of a potentiometer 40 connected across the second source 38.

The manner of operation of the circuit in the absence of line fluctuations is as follows. A video signal having positive synchronizing signals, is amplified and inverted by the action of the amplifier tube 12 producing a video signal, indicated at 41, having negative synchronizing signals in the plate circuit. This video signal is coupled through the blocking condenser 22 to the control grid of the cathode ray tube 23. Positive signals cause more electrons to flow in the cathode ray beam, thus making the picture brighter at these times, while negative voltages make the beam less intense and the picture darker. The same voltage 41, passing through the network 33, 34, 35, causes the picture brightness tube 32 to draw current on the negative peaks, which are the synchronization signals, thus charging the condenser 22 and maintaining the average brightness of the picture.

Variations in line supply voltage are low in frequency and therefore will not be reduced materially by the action of the bypass condensers 16, 27 and 29.

If the voltage in the B supply increases, the voltage on the plate of the amplifier tube 12 increases, and the average voltage of the signal rectified by the brightness tube 32 becomes temporarily more positive, tending to cut off this tube. In the absence of the connection between the plate of the brightness tube 32 and the cathode of the amplifier tube 12, this would result in a corresponding decrease in the brightness of the cathode ray tube fluorescent screen, which would be undesirable.

With the connection as shown, an increase in voltage causes the screen of the amplifier tube 12 to draw more current, thus making the cathode of this tube more positive. The plate of the brightness tube becomes more positives, increasing rectification and tending to offset or prevent the undesirable changes in picture brightness.

Another effect of variation in B supply is to change the voltage on the grid of the cathode ray tube 23. Since the cathode of this cathode ray tube normally is at a low potential point on the potentiometer 40, voltage variations here will, in general, be small. The brightness of the tube depends on the voltage difference between grid and cathode thereof. By connecting the cathode condenser 39 to the condenser 27, rather than to ground, low frequency voltage variations in the grid have their counterpart in cathode voltage variations.

The operation of my invention may be somewhat likened to a Wheatstone bridge which maintains itself approximately in balance over the range of frequencies at which line variations occur. In Figure 1, two bridge structures are shown.

The first bridge, which is mainly resistive, connects the variable "B" supply to the restorer tube 32. The cathode of this restorer tube 32 is connected through a series network 33, 34, 35, and 22, for the most part resistive, to the positive terminal of the fluctuating "B" supply voltage through the inductance 24 and resistance 25 and through a shunt resistor 36 to the negative terminal of the fluctuating "B" supply voltage, while the plate is fed from the positive terminal of the fluctuating "B" supply voltage through the internal series plate resistance of the amplifier tube 12 and from the negative terminal of this voltage supply through the shunt resistance 28. The balance of this bridge can never be exact because of the blocking capacitor 22 and the action of this bridge is further complicated by the reactance of the capacitors, 16 and 29 and by the network 34, 35 in parallel with the resistor 33.

The second bridge, which has series capacitors and shunt resistors, connects the "B" supply to the cathode and control grid of the cathode ray tube 23. The grid is connected by means of the series capacitor 22 to the positive polarity of the fluctuating "B" voltage through the inductance 24 and resistance 25 and to the negative terminal of this fluctuating voltage through the shunt resistors 33 (shunted by 34 and 35) and 36. The cathode is connected by means of the series capacitor 39 to the positive terminal of the fluctuating "B" voltage and is connected to the negative terminal of this fluctuating voltage through a shunt resistance comprising the parallel resistance of the ends of the potentiometer 40 on either side of the tap and the input resistance of the cathode ray tube 23. As long as the time constants of the two circuits are equal, the bridge will be balanced. In the embodiment shown, the time constant of the grid circuit is .01 uf.×.94 megohm=approximately .01 second; and the time constant of the cathode is .5 uf.×approximately 20,000 ohms=.01 second.

It will be noted that certain impedance elements, viz 22, 33, 34, 35 and 36 are common to both bridges in the circuit shown in the drawing and described above, thereby reducing the number of elements that would otherwise be required. Further, it will be noted that certain of the elements function simultaneously in different positions or "arms" of the two bridges, i. e., the condenser 22 and the resistor 36 function in relatively different "arms" of the two bridges. As far as the diode tube bridge circuit is concerned, the inductance 24 and resistance 25 form part of the voltage supply impedance and are not elements of the bridge. As far as the cathode ray tube bridge circuit is concerned, these impedances, 24 and 25, are a part of an arm of the bridge circuit.

In combination with the other circuit elements and with each other, the two bridge structures have resulted in a television receiver whose viewed brightness is not affected to any extent by line variations over the frequency range where brightness variations have been heretofore objectionable, this range being between approximately twenty cycles per second where the bypassing action of the filter condensers becomes inadequate and approximately one cycle per second where brightness variations of observed magnitude are no longer objectionable.

Figure 2:
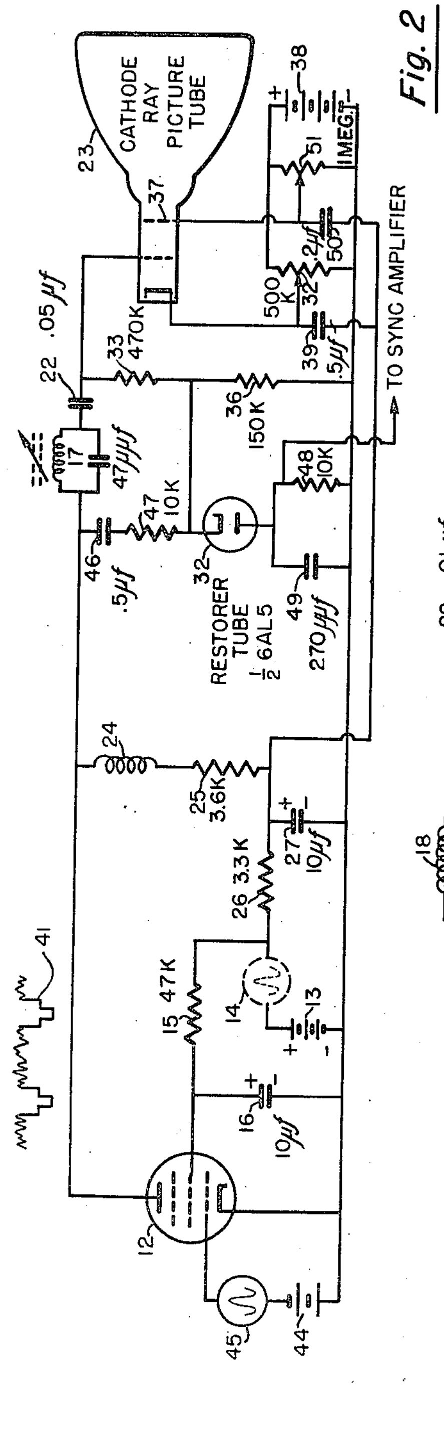
Figure 2 shows schematically an alternate embodiment of the invention.

In Figure 2 there is shown another embodiment of the invention. Insofar as the circuit is similar to that of Figure 1, similar reference numerals have been used. In this modification, a source 44 of fixed bias is connected to the grid of the video amplifier tube 12, and the preceding stages of the receiver are represented by a generator 45. The composite video signal 41, containing synchronization signals, is in this case fed from the plate of the amplifier tube 12 through the series combination of a coupling capacitor 46 and resistor 47 to the cathode of the brightness tube 32. The plate of the brightness tube is in this case connected to the parallel combination of a resistor 48 and a capacitor 49 so that the tube also can act as a synchronization signal separator, the separated signals being available at the plate of the brightness tube.

As before, the cathode of the cathode ray tube 23 is bypassed to the positive side of the B supply. In addition, in this circuit, the first anode 37 is also bypassed to the same point by means of the condenser 50, the first anode receiving its bias from an adjustable potentiometer 51 connected to the direct voltage source 38.

Figure 3:
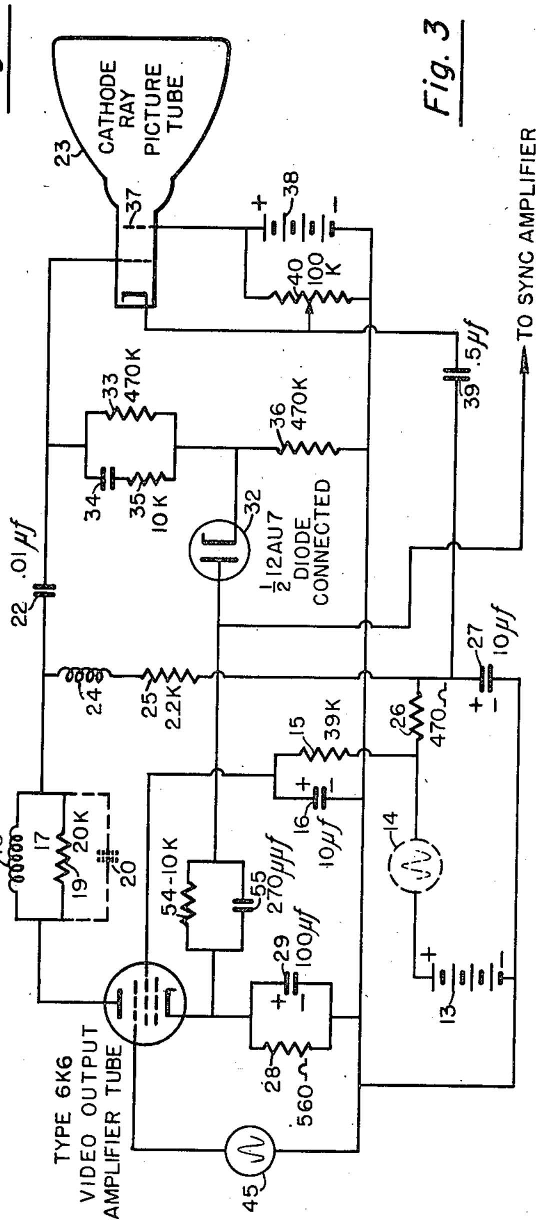
Figure 3 is a modification of the circuit shown in Figure 1.

The circuit shown in Figure 3 is similar to that shown in Figure 1 except that the parallel combination of a resistor 54 and a capacitor 55 have been added in series with the tube 32 so that separated synchronization signals may be taken directly from the plate of this tube. In this circuit the immunity to low frequency variations enjoyed by the restorer tube as explained above is extended to the clipping of synchronization signals, or, in other words, the level at which sync signals are clipped will not be affected by low frequency line variations.

Although specific features and embodiments of my invention have been shown and described, the scope of the invention can be best described by the following claims.

What is claimed is:

1. A stabilized television circuit comprising an amplifier tube having a cathode, an input electrode and an output electrode, a source of signals connected to said input electrode, a D.-C. power supply subject to voltage variations and having a negative terminal and a positive terminal, a first electrical impedance connected in series between said cathode and said negative terminal, a conductive electrical path connecting said output electrode to said positive terminal, second and third electrical impedances connected in series between said output electrode and said negative terminal to receive said signal from said electrode and to receive said voltage variations through said electrical path, one end of said series-connected impedances being connected to said negative terminal, and a rectifier member connected between the junction of said first impedance with said cathode and the junction of said second and third impedances, said amplifier tube comprising one arm of a bridge circuit, said first impedance comprising a second arm of said bridge circuit, said second and third impedances comprising, respectively, third and fourth arms of said bridge circuit substantially balanced with respect to said first and second arms for said voltage variations.

2. A stabilized television circuit for obtaining synchronizing signals from a combined video and synchronizing signal, comprising an amplifier tube having a cathode, an input electrode and an output electrode, a source of combined video and synchronizing signals connected to said input electrode, a D.-C. power supply subject to voltage variations and having a negative terminal and a positive terminal, a first electrical impedance connected in series between said cathode and said negative terminal, a load impedance connected in series between said output electrode and said positive terminal, second and third electrical impedances connected in series between said output electrode and said negative terminal, a rectifier member and an electrical impedance connected in series between the junction of said first impedance with said cathode and the junction of said second and third impedances, and synchronizing signal utilization means connected to said last-mentioned impedance, said amplifier tube comprising one arm of a bridge circuit, said first impedance comprising a second arm of said bridge circuit, said second and third impedances comprising, respectively, third and fourth arms of said bridge circuit substantially balanced with respect to said first and second arms for said voltage variations.

References Cited in the file of this patent

UNITED STATES PATENTS

| | | |
|---|---|---|
| 2,116,671 | Dowsett et al. | May 10, 1938 |
| 2,227,001 | Schlesinger | Dec. 31, 1940 |
| 2,227,026 | Schlesinger | Dec. 31, 1940 |
| 2,227,028 | Schlesinger | Dec. 31, 1940 |
| 2,227,197 | Percival | Dec. 31, 1940 |
| 2,232,553 | Moyer | Feb. 18, 1941 |
| 2,235,040 | Penner | Mar. 18, 1941 |
| 2,240,281 | Ballard | Apr. 29, 1941 |
| 2,249,532 | Lewis | July 15, 1951 |
| 2,252,746 | Williams | Aug. 19, 1941 |
| 2,254,114 | Wilson | Aug. 26, 1941 |
| 2,255,484 | Dome | Sept. 9, 1941 |
| 2,255,485 | Dome | Sept. 9, 1941 |
| 2,295,059 | Smyth | Sept. 8, 1942 |
| 2,301,343 | Tarr | Nov. 10, 1942 |
| 2,302,876 | Malling | Nov. 24, 1942 |
| 2,315,619 | Hutcheson | Apr. 6, 1943 |
| 2,362,769 | Parratt | Nov. 14, 1944 |
| 2,371,897 | Knick | Mar. 20, 1945 |
| 2,413,020 | Wolfner | Dec. 24, 1946 |
| 2,455,373 | Lester | Dec. 7, 1948 |
| 2,489,155 | Richter | Nov. 22, 1949 |
| 2,522,967 | Shaw | Sept. 19, 1950 |
| 2,533,081 | Anderson et al. | Dec. 5, 1950 |
| 2,537,807 | Anderson | Jan. 9, 1951 |
| 2,540,646 | Bernard | Feb. 6, 1951 |
| 2,543,037 | Mayle | Feb. 27, 1951 |
| 2,550,960 | Brabham | May 1, 1951 |

FOREIGN PATENTS

| | | |
|---|---|---|
| 845,897 | France | Sept. 4, 1939 |

OTHER REFERENCES

Alternating Current Electrical Engineering, Philip Kemp, MacMillan Company, London, 1949, pages 588–590.